United States Patent [19]

Janich

[11] Patent Number: 5,667,226
[45] Date of Patent: Sep. 16, 1997

[54] DEVICE FOR PROVIDING A SEAL BETWEEN TWO PARTS OF AN INSTALLATION

[75] Inventor: Hans-Jurgen Janich, Beckum, Germany

[73] Assignee: Mannesmann Aktiengesellschaft, Dusseldorf, Germany

[21] Appl. No.: 481,536

[22] PCT Filed: Jul. 7, 1994

[86] PCT No.: PCT/EP94/02221

§ 371 Date: Jul. 13, 1995

§ 102(e) Date: Jul. 13, 1995

[87] PCT Pub. No.: WO95/02136

PCT Pub. Date: Jan. 19, 1995

[30] Foreign Application Priority Data

Jul. 8, 1993 [DE] Germany ............... 43 22 806.2

[51] Int. Cl.⁶ .................................................. F16J 15/05
[52] U.S. Cl. ................................. 277/189; 277/236
[58] Field of Search ................................. 277/189, 236; 49/480.1, 493.1, 496.1, 498.1, 499.1

[56] References Cited

U.S. PATENT DOCUMENTS

| | | |
|---|---|---|
| 2,339,398 | 1/1944 | Hennessey et al. ............ 49/496.1 |
| 2,345,743 | 4/1944 | Gaston . |
| 2,400,470 | 5/1946 | Spraragen . |
| 2,657,438 | 11/1953 | Spraragen . |
| 2,895,759 | 7/1959 | Conrad et al. . |
| 2,994,930 | 8/1961 | Cromwell ................ 49/496.1 |
| 3,020,185 | 2/1962 | Moffitt, Jr. et al. . |
| 3,029,805 | 4/1962 | Scott . |
| 3,037,251 | 6/1962 | Landis . |
| 4,441,726 | 4/1984 | Uhl . |
| 4,509,292 | 4/1985 | Konle ................. 49/499.1 |
| 4,527,773 | 7/1985 | Muller et al. . |
| 4,660,805 | 4/1987 | Hahn et al. ................ 277/236 |
| 4,724,863 | 2/1988 | Connor .................. 277/236 |
| 4,811,529 | 3/1989 | Harris et al. ............... 277/189 |
| 5,099,886 | 3/1992 | Squirrell ................. 277/236 |
| 5,193,823 | 3/1993 | Janich .................. 277/236 |

FOREIGN PATENT DOCUMENTS

| | | | |
|---|---|---|---|
| 134436 | 9/1949 | Australia ............... | 49/496.1 |
| 0340430 | 11/1989 | European Pat. Off. . | |
| 4122605A1 | 1/1993 | Germany . | |

*Primary Examiner*—Scott Cummings
*Attorney, Agent, or Firm*—Learman & McCulloch

[57] ABSTRACT

A sealing device for effecting a seal between two relatively movable members, such device being formed from a single strip of springy metal shaped to form a hollow body from which a pair of parallel mounting legs extend. Between the legs is one part of a reinforcing member having a second part which extends into the body and overlies and spans the bottom thereof. Fasteners secure the mounting legs and the reinforcing member to one of the relatively movable members.

9 Claims, 2 Drawing Sheets

DEVICE FOR PROVIDING A SEAL BETWEEN TWO PARTS OF AN INSTALLATION

The invention relates to a device for sealing between two apparatus parts which are movable relative to one another, particularly between two valve flaps, comprising a sealing element formed by a spring steel strip which has two plane gripping rims which are disposed parallel adjacent to one another, are directed towards the same side and can be fixed on one apparatus part by means of a clamping arrangement, as well as a curved sealing zone, wherein at least one bend is provided at least between one of the two gripping rims and the sealing zone and wherein the other apparatus part comes into contact with the sealing element in the crest region of the curved sealing zone and the relative movement between these two apparatus parts occurs approximately tangentially with respect to this crest region.

BACKGROUND OF THE INVENTION

A shut-off valve is already known from DE-A-41 22 605 in which the sealing element is formed by a spring steel strip bent in a U shape. The two arms of this spring steel strip are fixed with their free ends on the stationary apparatus part, and at least the arm which co-operates with the movable apparatus part extends substantially in the direction of closure of this apparatus part. In this case a stiffening arrangement is provided to retain the arm of the spring steel strip facing the stationary apparatus part.

Such a shut-off valve has several considerable disadvantages. For instance the elongated sealing element is inclined to uncontrolled deformation. Since moreover the working surface of the sealing element which is exposed to the gas pressure is comparatively large, there is a great danger of the sealing element lifting off from the counter-surface under certain operating conditions. Due to the relative arrangement between the sealing element and the movable apparatus part (for example a valve) co-operating with one arm of this sealing element, it is also necessary in this known construction for the sealing zone to be interrupted in the region of the movable apparatus part, which brings with it the danger of leaks in this region.

The aforementioned disadvantages of the known construction are avoided in a generic device according to EU-B-0 340 430. In this construction the sealing element has at least one bend between one of the two gripping rims which extend parallel to one another and a curved sealing zone, the other apparatus part comes into contact with the sealing element in the crest region of the curved sealing zone and the relative movement between both apparatus parts occurs approximately tangentially with respect to this crest region.

In a device of this type uncontrolled deformations of the sealing element can be avoided much better. Since moreover the gas pressure which acts in the direction of lifting off the sealing element finds a substantially smaller working surface in the known construction described above, a reliable seal is ensured even in unfavourable operating circumstances. Finally, it is advantageous that a sealing element of the generic type can be so arranged relative to the movable apparatus part that an uninterrupted sealing zone is also produced in the shaft region of the moving apparatus part.

Certain improvements have proved desirable in the further development of the device according to EU-B-0 340 430.

The sealing element according to EU-B-0 340 430 is often lifted off somewhat from its bearing surface during the relative movement of the two apparatus parts, so that it is subject to bending stress near its fixing point, which can lead to breaking at this point after a certain operating time.

Furthermore, it has been established that when used in gas conduits with high flow speeds such sealing elements are caused to oscillate, which also brings with it undesirable stresses on the fixing point.

The object of the invention, therefore, is to avoid these disadvantages and to construct a device in such a way that the sealing element substantially maintains its position during a relative movement of the apparatus parts and in particular is not lifted off from its bearing surface. Furthermore, disruptive oscillations of the sealing element should also be largely suppressed.

SUMMARY OF THE INVENTION

This object is achieved according to the invention in that a support element is disposed in the interior of the sealing element in such a way that it bears on the sealing element near the bend and during a relative movement of the apparatus parts it counteracts any lifting off of the supported region of the sealing element from its counter-surface.

It is significant that in the solution according to the invention the support element provided in the interior of the sealing element is disposed so that it bears on the sealing element precisely in the vicinity of the bend between the curved sealing zone and one gripping rim and during a relative movement of the apparatus parts it counteracts any lifting off the supported region of the sealing element from its counter-surface, particularly lifting off of the said bend. In this way the fixing point in particular of the sealing element is protected from undesirable bending stresses. At the same time the desirable bend is also maintained with respect to the varying operational stresses.

THE DRAWING

Two embodiments of the invention are illustrated in a diagrammatic section in FIGS. 1 and 2 of the drawings.

DETAILED DESCRIPTION

Figure 1:
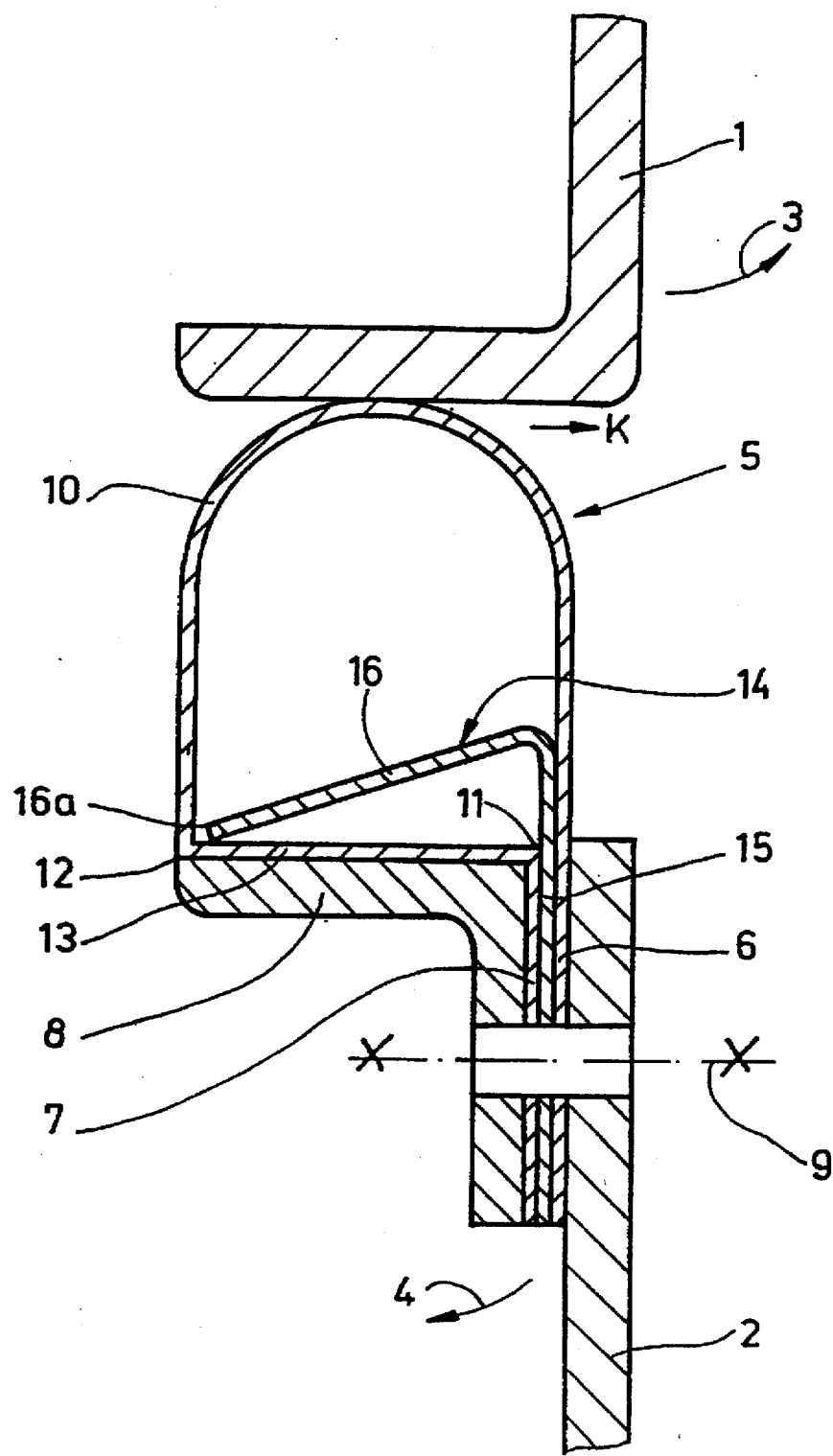

FIG. 1 shows a first embodiment of the device according to the invention for sealing between two valve flaps 1 and 2 which are movable relative to one another, are shown in the closed position and carry out a pivoting movement in the direction of the arrows 3 and 4 respectively during opening of the valve.

A sealing element which is formed by a spring steel strip is mounted on the valve flap 2. This sealing element 5 contains two plane mounting leg portions or gripping rims 6, 7 which are disposed parallel adjacent to one another, are directed towards the same side (downwards in FIG. 1) and are fixed on the valve flap 2 by means of a clamping arrangement consisting of a clamping angle piece 8 and a plurality of clamping screws 9.

The sealing device includes a hollow body having substantially parallel side walls joined at corresponding ends to a domed or convex top wall 10. One side wall is simply a continuation of the mounting leg 6. The other side wall is joined by a right angle bend 12 to an extension 13 which underlies the top wall 10 and overlies the member 8. The extension 13 forms a bottom for the hollow body and extends toward the mounting leg 6, but terminates short thereof and is bent at a right angle to form the mounting leg 7 which is parallel to and spaced from the leg 6. All of the parts 5–13 are formed from a single strip of springy steel of uniform thickness.

A reinforcing member 14 has one arm 15 interposed between the mounting legs 6 and 7 and another arm 16 which extends into the hollow body and is bent to overlie the bottom of the hollow body. The included angle between the two arms is between 45° and 85°, preferably between 60° and 80°, with one another. The arm 15 is element 5 and fixed by means of the same clamping arrangement (clamping angle piece 8 and clamping screws 9).

The other arm 16 of the support element 14 bears with its free end 16a on the inner face of the sealing element 5 near the second 90° bend In the closed position (FIG. 1) the valve flap 1 is in contact with the crest region of the curved sealing zone of the sealing element 5. The relative movement between the valve flaps 1 and 2 during opening and closing of the valve occurs approximately tangentially with respect to this crest region.

If the valve flaps 1 and 2 are moved relatively to one another in the direction of opening according to the arrows 3 and 4 respectively, then a force K, which attempts to deform the sealing element 5 and to lift the bearing region 13 off from the clamping angle piece 8 (which would lead to undesirable bending stress on the bend 11 as mentioned in the introduction), is exerted on the sealing element 5 by way of the curved sealing zone 10. However, the support element 14 reliably counteracts such lifting off and in this way prevents dangerous bending stresses on the fixing point. Moreover, the support element 14 protects the sealing element 5 effectively from oscillations and vibrations caused by high gas flow speeds.

Figure 2:
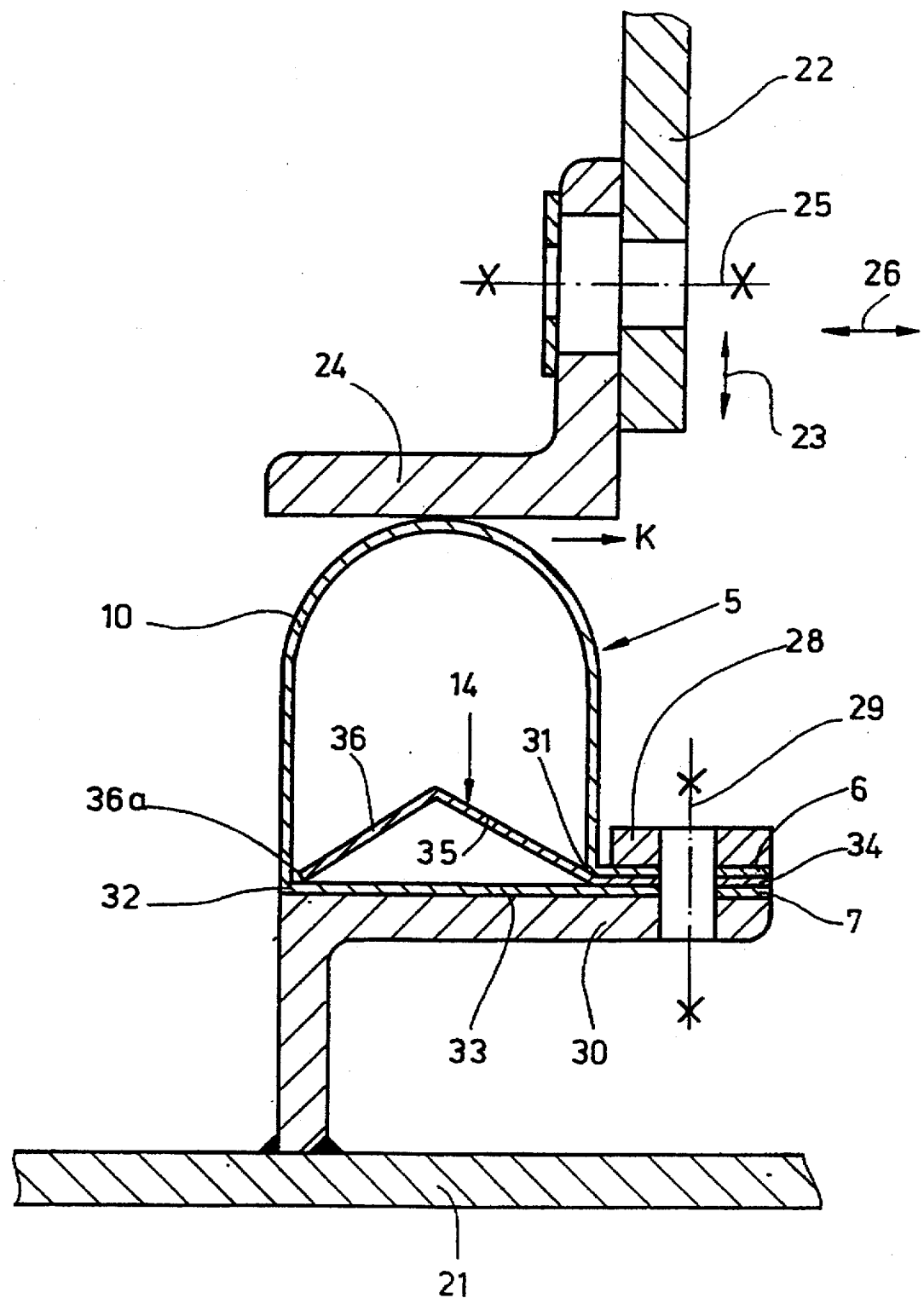

In the second embodiment of the invention illustrated in FIG. 2 the same reference numerals are used for the same elements as in FIG. 1.

In this case the two apparatus parts which are movable relative to one another are formed by a valve housing 21 and a valve flap 22, the valve flap 22 bearing an angle piece 24 which is adjustable in the direction of the double arrow 23 and is connected by screws 25 to the valve flap 22. The valve flap 22 and the angle piece 24 borne thereby are movable relative to the valve housing 21 in the direction of the double arrow 26 during opening and closing of the valve.

The sealing element 5 again contains two mounting leg or rims 6 and 7 which are gripped together by means of a clamping arrangement (consisting of a clamping plate 28, clamping screws 29 and a support surface 30).

A 90° bend 31 or 32 respectively is provided in each case between the two gripping rims 6 and 7 of the curved sealing zone 10 forming a closed hollow body such that extensions of the mounting legs 6,7 project in the same direction beyond one side of the body. The sealing element 5 bears on the support surface 30 with its bearing region 33 located between the gripping rim 7 and the associated bend 32.

In this embodiment too there is provided in the interior of the sealing element 5 a support or reinforcing element 14 which has following its zone 34 gripped between the two gripping rims 6 and 7 of the sealing element 5 a v-shaped structure (consisting of the roof surfaces 35, 36) and bears on the inner face of the sealing element 5 with its free end 36a near the 90° bend 32 adjoining the bearing region 33.

In this embodiment too, during a movement of the valve flap 22 towards the right a force K which attempts to lift the bearing region 33 off from the supporting surface 30 and to subject the fixing point to bending stress is exerted on the sealing element 5. However this is reliably counteracted by the support element 14.

I claim:

1. A sealing device for effecting a seal between two relatively movable members, said device comprising a hollow body having a pair of substantially parallel, spaced apart side walls joined at corresponding ends by a domed top wall and having a flat bottom wall underlying said top wall and joined to one of said side walls at substantially a right angle, a pair of substantially parallel, spaced apart mounting legs, one of which is joined to the other of said side walls and the other of which is joined to said bottom wall; a reinforcing member having a first part interposed between said mounting legs and a second part extending into said body, said second part spanning said bottom wall and having a free end terminating adjacent the juncture of said bottom wall and said one of said side walls; and fastening means for securing said mounting legs and said first part of said reinforcing member together.

2. The device according to claim 1 wherein said second part of said reinforcing member has a portion thereof inclined relative to said bottom wall.

3. The device according to claim 2 wherein said portion of said second part of said reinforcing member is substantially V-shaped.

4. The device according to claim 2 wherein said portion of said second part is substantially straight and inclined toward said bottom wall.

5. The device according to claim 4 wherein said portion of said second part of said reinforcing member is inclined at an angle of between about 45° and 85° to said first part.

6. The device according to claim 4 wherein said portion of said second part of said reinforcing member is inclined at an angle of between about 60° and 80° to said first part.

7. The device according to claim 1 wherein all of said walls and both of said mounting legs are formed from a single strip of springy metal.

8. The device according to claim 7 wherein all of said walls and both of said mounting legs are substantially uniform in thickness.

9. The device according to claim 1 wherein said bottom of said body seats upon one of said members and wherein said fastening means secure said device to said one of said members.

* * * * *